United States Patent
Carroll et al.

(10) Patent No.: US 7,834,077 B2
(45) Date of Patent: *Nov. 16, 2010

(54) HALOGEN CONTAINING-POLYMER NANOCOMPOSITE COMPOSITIONS, METHODS, AND PRODUCTS EMPLOYING SUCH COMPOSITIONS

(75) Inventors: David Carroll, Central, SC (US); John Ballato, Clemson, SC (US); Stephen Foulger, Clemson, SC (US); Richard Czerw, Clemson, SC (US); Dennis Smith, Seneca, SC (US); Hiren Shah, Clemson, SC (US); Earl Wagener, Clemson, SC (US)

(73) Assignee: Clemson University Research Foundation, Clemson, SC (US)

( * ) Notice: Subject to any disclaimer, the term of this patent is extended or adjusted under 35 U.S.C. 154(b) by 796 days.

This patent is subject to a terminal disclaimer.

(21) Appl. No.: 11/649,200

(22) Filed: Jan. 3, 2007

(65) Prior Publication Data

US 2007/0112130 A1   May 17, 2007

Related U.S. Application Data

(63) Continuation of application No. 10/103,562, filed on Mar. 21, 2002, now Pat. No. 7,265,174.

(60) Provisional application No. 60/278,015, filed on Mar. 22, 2001.

(51) Int. Cl.
    C08K 3/34        (2006.01)
(52) U.S. Cl. .................. 524/445; 524/446; 524/447; 524/449; 524/451; 524/495; 524/496
(58) Field of Classification Search ................ 524/495, 524/496, 445–447, 449, 451
    See application file for complete search history.

(56) References Cited

U.S. PATENT DOCUMENTS

| | | |
|---|---|---|
| 3,397,191 A | 8/1968 | Beckerbauer |
| 4,663,230 A | 5/1987 | Tennent |
| 5,006,285 A | 4/1991 | Thackara et al. |
| 5,007,696 A | 4/1991 | Thackara et al. |
| 5,021,602 A | 6/1991 | Clement et al. |
| 5,023,380 A | 6/1991 | Babb et al. |
| 5,037,917 A | 8/1991 | Babb et al. |
| 5,037,918 A | 8/1991 | Babb et al. |
| 5,037,919 A | 8/1991 | Clement et al. |
| 5,066,746 A | 11/1991 | Clement et al. |
| 5,159,036 A | 10/1992 | Babb |
| 5,159,037 A | 10/1992 | Clement et al. |
| 5,159,038 A | 10/1992 | Babb et al. |
| 5,162,468 A | 11/1992 | Babb et al. |
| 5,198,513 A | 3/1993 | Clement et al. |
| 5,210,265 A | 5/1993 | Clement et al. |
| 5,246,782 A | 9/1993 | Kennedy et al. |
| 5,426,164 A | 6/1995 | Babb et al. |
| 5,470,910 A * | 11/1995 | Spanhel et al. ............. 524/785 |
| 5,627,140 A | 5/1997 | Fossheim et al. |
| 5,730,922 A | 3/1998 | Babb et al. |
| 5,753,088 A | 5/1998 | Olk |
| 5,773,834 A | 6/1998 | Yamamoto et al. |
| 5,849,830 A | 12/1998 | Tsipursky et al. |
| 5,850,498 A | 12/1998 | Shacklette et al. |
| 5,853,877 A | 12/1998 | Shibuta |
| 5,908,585 A | 6/1999 | Shibuta |
| 5,952,088 A | 9/1999 | Tsai et al. |
| 5,965,237 A | 10/1999 | Bruin et al. |
| 6,031,711 A | 2/2000 | Tennent et al. |
| 6,031,945 A | 2/2000 | You et al. |
| 6,037,105 A | 3/2000 | You et al. |
| 6,039,897 A | 3/2000 | Lochhead et al. |
| 6,052,238 A | 4/2000 | Ebbesen et al. |
| 6,099,965 A | 8/2000 | Tennent et al. |
| 6,124,365 A | 9/2000 | Lan et al. |
| 6,126,734 A | 10/2000 | Beall et al. |
| 6,203,814 B1 | 3/2001 | Fisher et al. |
| 6,210,867 B1 | 4/2001 | You et al. |
| 6,262,162 B1 * | 7/2001 | Lan et al. .................... 524/445 |
| 6,271,297 B1 * | 8/2001 | Ishida ........................ 524/445 |
| 6,276,214 B1 * | 8/2001 | Kimura et al. ................ 73/795 |
| 6,331,265 B1 | 12/2001 | Dupire et al. |

(Continued)

FOREIGN PATENT DOCUMENTS

WO    WO 9015043    12/1990

(Continued)

OTHER PUBLICATIONS

Shah et al, "Fluoropolymer Nanotube Composites for Coatings and Nanoscopic Probes", p. 300. Clemson University, presented Mar. 30, 2000.*

(Continued)

*Primary Examiner*—Edward J Cain
(74) *Attorney, Agent, or Firm*—Dority & Manning, P.A.

(57) ABSTRACT

The disclosure provides compositions prepared by combining nanomaterials with a halide-containing polymer, thereby forming a combined polymer matrix having dispersed nanomaterials within the matrix. The nanomaterials may be carbon-based nanotubes, in some applications. A halide-containing monomer is combined with nanotubes, and then polymerized in some compositions. In other applications, a halide-containing polymer is solution processed with nanotubes to form useful compositions in the invention. Also disclosed are probes for near field detection of radiation.

43 Claims, 15 Drawing Sheets

U.S. PATENT DOCUMENTS

| | | | |
|---|---|---|---|
| 6,388,046 | B1 | 5/2002 | Campbell et al. |
| 6,395,199 | B1 | 5/2002 | Krassowski et al. |
| 6,395,386 | B2 | 5/2002 | Bagrodia et al. |
| 6,407,155 | B1 | 6/2002 | Qian et al. |
| 6,414,070 | B1 | 7/2002 | Kausch et al. |
| 6,579,927 | B1 * | 6/2003 | Fischer ...................... 524/445 |
| 6,649,715 | B1 | 11/2003 | Smith et al. |
| 6,689,855 | B2 | 2/2004 | Smith et al. |
| 6,696,534 | B2 | 2/2004 | Smith et al. |
| 6,953,653 | B2 | 10/2005 | Smith et al. |
| 7,060,241 | B2 | 6/2006 | Glatkowski |

FOREIGN PATENT DOCUMENTS

| | | |
|---|---|---|
| WO | WO 9015082 | 12/1990 |

OTHER PUBLICATIONS

David A. Babb et al., Perfluorocyclobutane Aromataic Ether Polymers. III. Synthesis and Thermal Stability of a Thermoset Polymer Containing Triphenylphosphine Oxide, Journal of Applied Polymer Science, vol. 69, 1998, pp. 2005-2012.

Database CA 'Online! Chemical Abstracts Service, Columbus, Ohio, retrieved from STN Database accession No. 132:152543 XP002179957 abstract & Polym. Prepr., vol. 40, No. 2, 1999, pp. 1293-1294.

Louay, Eldada, Advances in Polymer Integrated Optics, pp. 54-68, IEEE Journal of Selected Topics in Quantum Electronics, vol. 6, No. 1, Jan./Feb. 2000.

R. Traiphol, H. Shah, D.W. Smith, Jr. and D. Perahia, Bulk and Interfacial Studies of a New and Versatile Semifluorinated Lyotropic Liquid Crystalline Polymer, Macromolecules 2001, 34, pp. 3954-3961, Published on Web May 5, 2001.

Ajayan, P.M., Nanotubes from Carbon, Chem. Rev., vol. 99, 1999, pp. 1787-1799, Published on Web May 1, 1999.

Smith, Jr., Dennis W., Kumar, Suresh M., Chen, Shengrong, Ballato, John M., Nelson, Erik J., Jin, Jack J., and Foulger, Stephen H., Property Tailored Perfluorocyclobutyl (PFCB) Copolymers for Optical Devices, SPEI Proc. 2001, 4439, pp. 51-62.

Ajayan, P. M., Stephan, O., Colliex, C., and Trauth, D., Aligned Carbon Nanotube Arrays Formed by Cutting a Polymer Resin-Nanotube Composite, Science, vol. 265, Issue 5176, Aug. 26, 1994, pp. 1212-1214.

Yang, Feng, Ou, Yuchun, and Yu, Zhongzhen, Journal of Applied Polymer Sciences, vol. 69, 1998, pp. 355-361.

Dai, Hongjie, Hafner, Jason H., Rinzler, Andrew G., Colbert, Daniel T. and Smalley, Richard E., *Nanotubes as Nanoprobes in Scanning Probe Microscopy*, Nature, vol. 384, Nov. 14, 1996, pp. 147-150.

Hafner, Jason H., Cheung, Chin Li, and Liber, Charles M., *Growth of Nanotubes For Probe Microscopy Tips*, Nature, vol. 398, Apr. 29, 1999, pp. 761-762.

Babb, David A., Snelgrove, Vernon, Smith, Jr., Dennis W. and Mudrich, Scott F., *Novel Step-Growth Polymers from the Thermal [2π+2π] Cyclopolymerization of Aryl Trifluorovinyl Ether Monomers*, American Chemical Society, 1996, pp. 431-441.

Smith, Jr., Dennis W., Chen, Shengrong, Topping, Chris M., Jin, J., Nordin, Greg, Cardenes, Jaime, Ballato, John, and Foulger, Stephen, *Perfluorocyclobutyl Copolymers For Microphotonics: Thermo-Optics and Wafe-Guide Micromolding*, Polym. Prepr., vol. 43, No. 2, 2002.

Article—*The Application of Carbon Nanotube-Polymer Composite as Gas Sensing Materials*, Authors; Seong M. Cho, Young Jun Kim, Yong Shin Kim, Yoonseok Yang, Seung-Chul Ha—Publication Date: 2004 Conference Title: Proceeding of the IEEE Sensors 2004.—pp. 701-704.

Article—*Single-walled carbon nanotube-polymer composites: electrical, optical and structural investigation*—Authors: E. Kymakis, I. Alexandou, G.A.J. Amaratunga—Published *2002 Elsevier Science*.

Article—*Melt mixing of polycarbonate/multi-wall carbon nanotube composites*—Authors; Petra Potschke, Arup R. Bhattacharyya, Andreas Janke and Harald Goering—Published in *Composite Interfaces*, vol. 10, No. 45, pp. 389-404 (2003).

Article—*Segregated network polymer/carbon nanotubes composites*—Authors, A. Mierczynska, J. Friedrich, H.E. Maneck, G. Boiteux, and J.K. Jeszka—Published in the *Central European Journal of Chemistry* 2004 pp. 86-93.

Robinson, Gilbert C., "A Primer on Efflorescence", Talk Presented at the American Ceramic Society Convention, May 1995.

Stutzmann, Tervoort, Bastiaansen, Feldman and Smith, "Solid-State Replication of Relief Structures in Semicrystalline Polymers", pp. 557-562, Wiley-VCH Verlag GmbH. D-69469 Weinheim, 2000, Adv. Mater. 2000, 12, No. 8.

Hauffe, Petermann, Crosstalk-Enhanced Polymer Digital Optical Switch Based on a W-Shape, pp. 40-41, IEEE Photonics Technology Letters, vol. 12, No. 1, Jan. 2000, Berlin, Germany.

Lee, Kwon, Yoon, Shin, Fabrication of Polymeric Large-Core Waveguides for Optical Interconnects Using a Rubber Molding Process, pp. 62-64, IEEE Photonics Technology Letters, vol. 12, No. 1, Jan. 2000, Taejon, Korea.

Shah, Czerw, Carroll, Goldner, Hwang, Ballato, Smith, Jr., Fluoropolymer Nanotube Composites for Coatings and Nanoscopic Probes, p. 300, Clemson University, Clemson, South Carolina, presented Mar. 30, 2000.

Smith, Babb, Shah, Hoeglund, Traiphol, Perahia, Boone, Langhoff, Radler, Perfluorocyclobutane (PFCB) polyaryl ethers: versatile coatings materials, pp. 1-9, Clemson University, Clemson, South Carolina, 2000 Elsevier Science S.A.

Shah, Hoeglund, Radler, Langhoff, Smith, Jr., "Perfluorocyclobutane (PFCB) Polymers for Optical Fibers and Dielectric Waveguides", Polymer Reprints (Am. Chem. Soc. Div. Poly. Chem.) 1999, 40(2), 1293-1294.

Smith, Jr., Boone, Traiphol, Shah, Perahia, "Perfluorocyclobutyl Liquid Crystalline Fluoropolymers. Synthesis and Thermal Cyclopolymerication of Bis(trifluorovinyloxy)-α-methylstilbene", pp. 1126-1128, 2000 American Chemical Society, Published on Web Jan. 26, 2000.

Oh, Lee, Lee, "Polymeric Waveguide Polarization Splitter with a Buried Birefringent Polymer", pp. 1144-1146, 1999 IEEE Photonics Technology Letters, vol. 11, No. 9, Sep. 1999.

Salamone, "Polymeric Materials Encyclopedia", "Perfluorocyclobutane Aromatic Ether Polymers", pp. 4911-4920, CRC Press, vol. 7, 1996.

Hoeglund, Shah, Ballato, Langhoff, Macha, Limbach, Smith, Jr., "Random Perfluorocyclobutyl Copolymers with Controlled Optical Properties", pgs, Polymer Preprints 2000, 41(2), xxxx, published Aug. 2000.

Foulger, "Reduced Percolation Thresholds of Immiscible Conductive Blends", pp. 1899-1910, Journal of Polymer Science: Part B: Polymer Physics, vol. 37, 1999.

Fischbeck, Moosburger, Kostrzewa, Achen, Petermann, "Singlemode optical waveguides using a high temperature stable polymer with low losses in the 1.55µm range", pp. 518-519, Electronics Letters 13, Mar. 1997, vol. 33, No. 6.

Brown, "Small Optics Offer Big Correction", pp. 122-124, Photontonics Spectra, Jun. 2000.

Ruzicka & Degiorgi, 61 Phys. Rev. B R2468 (2000).

Smith et al., 77 Appl. Phys. Lett. 663 (2000).

* cited by examiner

|       | $\gamma_{polymer}$ (dynes/cm) | Fluorine (atom%) | Dispersion (est.) |
|-------|-------------------------------|------------------|-------------------|
| PMMA  | 37                            | 0%               | poor              |
| PFCB  | 37.8                          | 18.5%            | good              |
| PFCB co | 37.8                        | 25%              | good              |
| PVDF  | 25                            | 33%              | excel.            |
| PVDF co | ........                    | 53%              | best              |

*FIGURE 6*

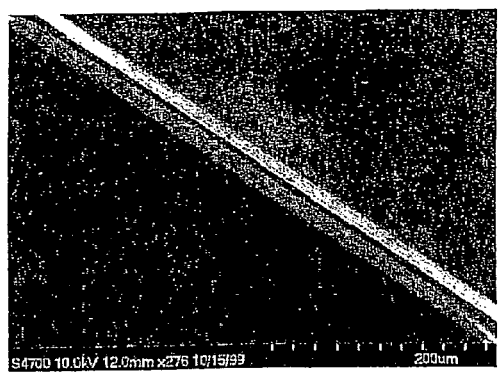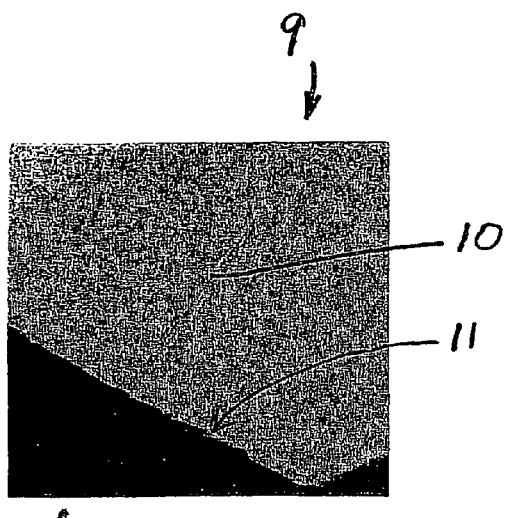
FIGURE 8a  FIGURE 8b

HALOGEN CONTAINING-POLYMER NANOCOMPOSITE COMPOSITIONS, METHODS, AND PRODUCTS EMPLOYING SUCH COMPOSITIONS

CROSS-REFERENCE TO RELATED APPLICATIONS

This application is a continuation application of U.S. patent application Ser. No. 10/103,562 filed on Mar. 21, 2002, now U.S. Pat. No. 7,265,174 which claims claims priority to an earlier filed provisional application, Ser. No. 60/278,015, filed in the United States on Mar. 22, 2001.

FIELD OF THE INVENTION

The invention is directed to uniquely homogeneous dispersions of nanometer-sized materials in halogen-containing polymers.

BACKGROUND OF THE INVENTION

To materials engineers, composites offer the ability to alter the properties of materials by combining the functionalities of several components for a specific purpose. It is widely believed that, for example, ceramic/polymer nano-engineered composites can be designed to exhibit the overriding strength, dimensional, and thermal stability of ceramics with the fracture properties, processability, and dielectric properties of polymers. "Matrix Nanocomposites" are a new class of materials, which exhibit ultra-fine dispersed phase dimensions, typically in the 1-100 nm range as well as a physically distinct host or continuous phase over much longer average length scales. The nano-length scale is the range where phenomena associated with atomic and molecular interactions strongly influence the macroscopic properties of materials such as electrical and thermal conductivity, strength, and optical clarity, for example, the longer length scale phase are typically used—in addition to the afore mentioned macroscopic properties—to determine processing and fabrication of the composite.

Preliminary experimental work on nano-composite materials have suggested that many types and classes of nanocomposites have new and improved properties when compared with their macro-scale counterparts (see for example: Ajayan, P. M. *Chem. Rev.* 1999, 99, 1787). A predominant feature of these materials is their ultra fine phase dimension and hence surface area; therefore a large fraction of the atoms reside at an interface. The properties can therefore be expected to be strongly influenced by the nature of the interface. For example, a strong interface should allow unusual mechanical properties. Since the interface structure plays a critical role in determining the properties of these materials they are frequently referred to as "interface composites".

To make a successful nanocomposite it is very important to be able to disperse the secondary phase (be it a nanosized metal, ceramic, or polymer) throughout the host material and create those interfaces.

Nanocomposites are now becoming viable commercial products. BIB.: Y. Feng, Y. Ou, Y. Zhongzhen, *J. Appl. Polym. Sci.*, 69(2), 355, 1998.). Most research and development is focused on automotive parts and packaging, and space durable composites ("Fluoropolymer Nanotube Composites for Coatings and Nanoscopic Probes" Shah, H.; Czerw, R.; Carroll, D.; Goldner, L.; Hwang, J.; Ballato, J.; Smith, Jr., D. W. *Polym. Mat. Sci. & Eng.* (*Am. Chem. Soc., Div. PMSE*) 2000, 82, 300.), display applications (P. M. Ajayan, O. Stephan, C. Colliex, and D. Trauth, *Science*, 265, 1212, 1994.), and atomic force microscopy (AFM) probes (Dai, H.; Hafner, J. H.; Rinzler, A. G.; Colbert, D. T.; Smalley R. E. *Nature*, 1996, 384, 147 and Hafner, H. G.; Cheung, C.; Lieber, C. M. *Nature*, 1999, 398, 761).

The benefits of such nanocomposites that have already been identified include: efficient reinforcement with minimal loss of ductility, improved impact strength, heat stability and flame resistance, improved gas barrier properties, improved abrasion resistance, reduced shrinkage and residual stress, altered electronic and optical properties (See for example: "Handbook of Nanophase Materials" A. N. Goldstein, Ed., Marcel Dekker, Inc., New York, 1997 and S. J Komarnemi, *Mater. Chem.*, 2, 1219, 1992). The shapes of the particles used in nanocomposites can vary from spherical, fibrilar, to platelets, and each will result in different properties modifications to the host. For example: for maximum reinforcement, platelets or fibrilar particles would be used, since reinforcement efficiency tends to scale with the aspect ratio (L/d). Further, performance benefits of nanoparticulate fillers are available without increasing the density or reducing light transmission properties of the base polymer. Although many research projects have been reported concerning all types of nanoparticles, the most extensive research has been performed with layered silicates, which provides platelet reinforcement.

Matrix nanocomposites, based on polymers, have been a central area of polymer research in recent years and significant progress has been made in the formation of various types of polymer-nanocomposites. This includes an understanding of the basic principles that determine their optical, electronic and magnetic properties. An early polymer nanocomposite that was developed was the polyamide 6 (from caprolactam), which has dispersed ion-exchanged montmorillonite, a smectic clay, as the reinforcement. Such nanocomposites typically contain 2-10% loadings on a weight basis, yet property improvements can equal and sometimes exceed traditional polymer composites even containing 20-35% mineral or glass. Machine wear is reduced and processability is better. Because polymers are, typically, about one-half as density as mineral and glass fillers these composites offer attractive opportunities for weight sensitive applications, such as auto parts.

Fluoropolymers are known to represent viable alternatives to current optical materials particularly for the critical next step in optical communications—access level all-optical networks (*Modern Fluoropolymers, Scheirs*, J., Ed.; Wiley: New York, 1997).

A pending U.S. patent application, Ser. No. 09/604,748 entitled "Fluoropolymers and Methods of Applying Fluoropolymers in Molding Processes" and assigned to the assignee of the present application is directed to uses of PFCB compounds in molding processes and optical applications.

Other publications have recited various synthesis methods and uses for PFCB and fluoropolymeric compounds. See, i.e. Smith et al, "Perfluorocyclobutyl Liquid Crystalline Fluoropolymers. Synthesis and Thermal Cyclopolymerization of Bis(trifluorovinyloxy)-alpha-methylstilbene", *Macromolecules*, Volume 33, Number 4, Pages 1126-1128; See also Smith et. al. "Perfluorocyclobutane (PFCB) polyaryl ethers: versatile coatings materials", Journal of Fluorine Chemistry 4310 (2000) 1-9. There is great potential for this optical fluoropolymer to further enhance its properties by using it in a nanocomposite where the nanomaterial provides unique interactions with light.

In regards to electrically conductive polymer composites, work has been done using carbon black as a second phase to permit conductivity in an otherwise dielectric host. See Foulger, Stephen: "*Reduced Percolation Thresholds of Immiscible Conductive Blends*", Journal of Polymer Science: Part B: Polymer Physics, Vol. 37, 1899-1910 (1999).

Although carbon black was used in the previous case, many forms of carbon exist. For example carbon may be in the form of submicron graphitic fibrils, sometimes called "vapor grown" carbon fibers. Carbon fibrils are vermicular carbon deposits having diameters less than about 1.0 micrometer. They exist in a variety of forms and have been prepared by catalytic decomposition of carbon-containing gases on metal surfaces.

U.S. Pat. No. 4,663,230 discloses cylindrical ordered graphite cores, uncontaminated with pyrolytic carbon. Blending such fibers with polymers has been known to improve the mechanical properties of the resulting blends.

More recently, it has been found that carbon tubes (often termed "nanotubes") provide a structure with potential for many such applications. In particular, the structure of carbon nanotubes makes their aspect ratio (length/diameter, L/D) comparable to that of long fibers. Typically the aspect ratio of carbon nanotubes is >10,000. Thus, the aspect ratio of carbon nanotubes is generally much greater than that of conventional short fibers, such as those often made of glass or other forms of carbon. In addition, nanotubes sometimes may be lighter than conventional carbon fibers,.which may be helpful in some applications.

Currently, carbon nanofibers and carbon nanotubes figure prominently among the organic-host nanocomposite fillers of interest. Vapor grown carbon nanofibers (VGCFs) in thermoplastic matrices have attracted much interest as they have potential application as conducting polymers for electrostatic dissipative coatings. In addition the VGCFs enhance both stiffness and thermal stability of the matrix. Thermoplastic matrices noted in recent studies include polypropylene, acrylate-butadiene-styrene, polyethylene, polycarbonate and polyether-terephthalate. Naturally, the interactions between the fiber and the matrix at the interfacal level are of critical importance to the properties of the developed composite. The catalytically grown carbon fibers used in these previous studies have outstanding physical properties such as high tensile modulus as well as low electrical resistivity and high thermal conductivity (1,950 W/mK). Further, these nanofibers can be surface-treated to promote different types of bonding. However, electrical and thermal conductivities as well as yield strengths and moduli are orders of magnitude larger for carbon nanotubes and one might want to extend these nanocomposites to include nanotube dispersions instead of VGCFs. This is because network formation at the percolation threshold of nanotubes may be achieved at relatively low mass concentrations because of their unusually high aspect-ratios. Hence, enhanced electrical and thermal conductivity may be possible in polymer/nanotube composites without sacrificing, for example, host optical clarity or flexibility.

Unfortunately, control over dispersive characteristics is significantly more difficult for carbon nanotubes. This comes about because, unlike VGCF, the surfaces of the nanotubes are exceedingly difficult to modify as they exhibit, primarily, unreactive carbon-carbon bonds.

Efforts have been made to incorporate carbon nanotubes into hydrocarbon-based polymeric materials, but difficulty has been encountered in providing compositions that perform well. In general, the number of carbon nanotubes that must be placed into a polymeric composition to achieve superior properties is so high that the actual physical and structural properties of the polymer may be deteriorated by the presence of the carbon nanotubes. This difficulty may be due to the fact that carbon nanotubes tend to clump and aggregate together (instead of uniformly dispersing) when placed in many hydrocarbon-based polymeric compositions.

This relatively poor control over the dispersive characteristics has made it difficult to employ carbon nanotubes in useful applications. The surfaces of such nanotubes may be exceedingly difficult to modify as well, since nanotubes exhibit primarily unreactive carbon-carbon bonds.

What is needed in the industry is a composition and method of preparing a composition that is capable of employing the useful properties of nanomaterial structures in a polymer matrix. A composition that successfully combines nanomaterial structures uniformly dispersed in a polymer matrix would be highly desirable.

SUMMARY OF THE INVENTION

The invention is directed to uniquely homogeneous dispersions of nanometer sized materials in halogen-containing polymers. Such compositions may include the use of nanotubes such as carbon-based nanotubes. Furthermore, nanotubes may be mixed into a halogen-containing polymer matrix. A halogen-containing monomer and/or polymer forms a compositional matrix with nanotubes. In some applications, a halogen-containing polymer is combined with nanotubes to achieve a relatively high level of nanotube dispersion. The homogeneity of the dispersion are superior in the invention.

Some specific applications of the invention employ fluoropolymers, while other specific applications may employ chloropolymers as the host polymer. Various products may employ compositions made according to the invention. These products and applications include: light emitting devices, nanoscopic probes, thermal management, electrical conductivity, electromagnetic interference, EMI shielding, linear and nonlinear optics (for example optical limiting), polymer actuation, and stealth (where each material can be in film, fiber, powder, liquid resin, or solution form), and others as well. This list is not exhaustive, and certainly other applications for the compositions exist as well, such as, for example, "dual function" applications involving multiples of the above properties. In particular, polymer electrical conductivity in addition to optical clarity represents a major need in applications requiring light transmission and static charge dissipation (e.g., for space durable optical film).

A number of factors combine to fuel interest in polymer based nanocomposite technology using clay minerals which include low loading levels, transparency, incorporation flexibility, safety, synergies with other additives and low cost. In the past, combinations of clays in such materials have not been compatible with polymers and hence surface modified to render them hydrophobic. Polymers such as polyimide, epoxy resin, polystyrene, polycaprolactone, acrylic polymer and polypropylene have been explored to fabricate polymer nanocomposites using clays which form the main inorganic nanocomposites.

BRIEF DESCRIPTION OF THE DRAWING

The following Figures illustrate the invention:

FIG. 6 is a Table showing surface energies and fluorine content for the polymers featured in the study herein;

FIG. 8a shows a drawn PFCB fiber containing carbon nanotubes; and

FIG. 8b illustrates a probe having a nanocomposite fiber with a nanotube protruding from the frontal surface of the probe.

DETAILED DESCRIPTION OF THE INVENTION

Figure 1A:
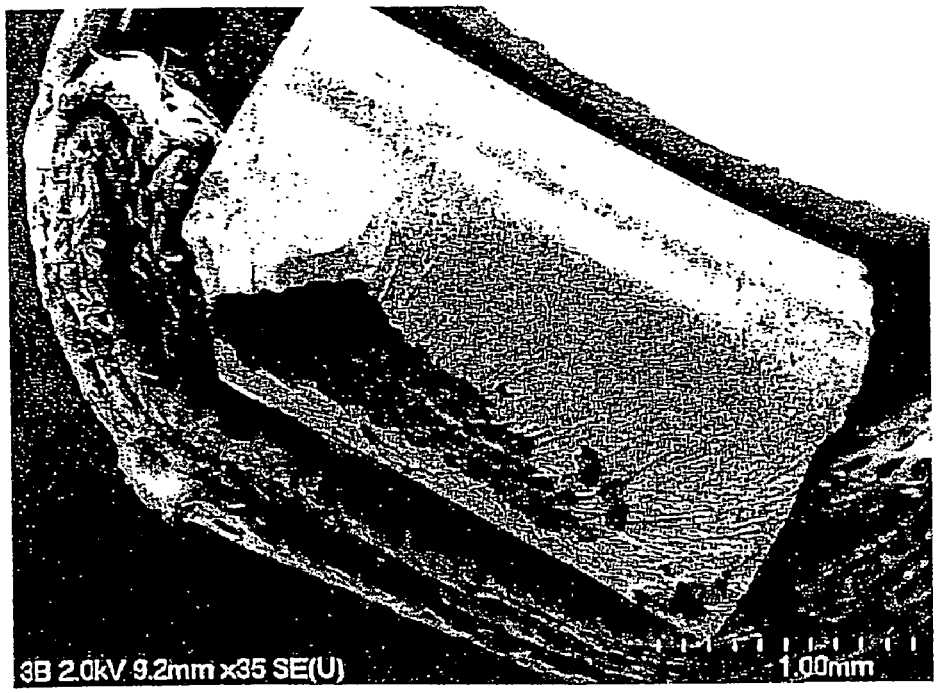
FIGS. 1*a-c* show photographs of a PFCB composite.

Reference now will be made to the embodiments of the invention, one or more examples of which are set forth below. Each example is provided by way of explanation of the invention, not as a limitation of the invention. In fact, it will be apparent to those skilled in the art that various modifications and variations can be made in this invention without departing from the scope or spirit of the invention.

Both organic and inorganic nanomaterials may be combined with halogen-containing monomers or halogen-containing polymers in the practice of the invention. Among the inorganic nanomaterials, some may be based on clays, such as montmorillonite, kaonite, bentonite, mica, talc, silica nanoparticles and the like as further disclosed in Examples below. "Nanocomposite materials" or "nanocomposites" as used herein shall include a class of materials that exhibit ultra-fine phase dimensions, typically in the 1-100 nm range, as well as a physically distinct host phase existing over much longer average length scales. The nano-length scale is the range in which phenomena associated with atomic and molecular interactions strongly influence the macroscopic properties of materials such as electrical and thermal conductivity. Longer length scales may be used to determine processing parameters of the materials. Although the following discussion focuses primarily on polymer/carbon nanotube-based nanocomposites, in general, "nanocomposite materials" and "nanocomposites" as used herein also refers to other nano-sized materials such as, but not limited to, those comprised of Group III-through-Group V-elements, transition metal oxides (e.g., vanadium oxide), and others.

Further, in regards to inorganic/polymer nanocomposites there are at least two types of inorganic layered silicate/polymer nanocomposites, i.e. intercalates and exfoliates, depending upon the organization of the silicate layers. Intercalates are obtained when polymer is located between the silicate layers and while the layer spacing is increased. There are attractive forces between the silicate layers which cause the layers to be provided in regularly spaced stacks. Exfoliates are obtained when the layer spacing increases to the point at which there no longer is sufficient attraction between the silicate layers to cause a uniform layer spacing. In exfoliates, silicate layers are randomly dispersed throughout the composite.

Organosilicates may be more compatible with engineering plastics, as they usually contain various functional groups that interact and/or react with the polymer to improve adhesion between the inorganic phase and the matrix.

Various methods of synthesis may be employed:
(1) Nanomaterials can be solution mixed with dissolved pre-formed polymer.
(2) Nanomaterials can be melt mixed with molten pre-formed polymer.
(3) Nanomaterials can be solution mixed with insitu solution polymerization of the host polymer.
(4) Nanomaterials can be melt mixed with insitu melt polymerization of host polymer.
(5) Nanomaterials can be mixed via multi-phase processes involving both pre-formed polymer and/or insitu polymerization such as, aqueous dispersion or emulsion polymerization with or without the addition of surfactants.
(6) Nanomaterials can be mixed with pre-formed polymers or by insitu polymerization as described in 1-5 above with or without the aid of heat and sonication.
(7) Nanomaterials can be mixed with sol-gel precursors such as tetraalkoxysilanes (eg., TEOS or TMOS) or otherwise organic functional trialkoxysilanes and polymerized by catalytic hydrolysis to a silicate or silicate/organic hybrid nanocomposite.

Carbon nanotubes are one type of nanomaterial (single-walled or multi-walled) that sometimes behave like one dimensional metallic conductors or low band gap semi-conductors. Incorporation of carbon nanotubes in insulating polymer matrices may increase the electrical conductivity of the composites by several orders of magnitude. For purposes of this specification the term "nanotube" shall refer to a nanomaterial that assumes a tubular or cylindrical shape.

Carbon nanotubes may act as nanometric heat sinks. Network formation or percolation threshold of nanotubes may be achieved at relatively low concentrations because of their unusually high aspect ratios. Hence, enhanced electrical and thermal conductivity may be obtained in polymer/nanotube composites, without sacrificing optical clarity, since their diameter is sufficiently small that light is not strongly absorbed or scattered.

It is advantageous in many industries (including electronics, optoelectronics, and aerospace) to have mechanically flexible electrically and thermally conductive coatings and substrates. In addition, composites possessing these features and optical clarity are desired. In the present invention, the halopolymer nanocomposites possess the requisite thermal and electrical conductivities. More specifically, for aerospace structures, a conductivity of ca. $10^{-7}$ S/cm is needed for static charge dissipation. Further, management of thermal cycles on aerospace structures also is desired. The halopolymer nanocomposites exhibit adequate thermal and electrical conductivity for these applications while maintaining mechanical flexibility and toughness as well as optical clarity. This is realized through the unique level of dispersion for very low loadings (<0.1 to 5 weight %) of high conductivity nanotubes afforded by the halopolymer host comprised in the nanocomposites disclosed in the invention.

It has been found that halogen-containing polymers exhibit unique compatibility with carbon nanotubes, and that such nanotubes may be dispersed by simple solution or melt processes to provide unique levels of homogeneity. In this invention, the dispersion properties of carbon nanotubes are disclosed for several halogen-containing polymer matrix formations.

In making the compositions of the invention, it is possible to combine nanotubes with halogen-containing monomers. It also is possible to combine nanotubes with halogen-containing polymers. That is, polymerization may occur either before or after application of nanotubes, depending upon the particular application. Copolymers also may be used.

The invention is comprised, in one embodiment, of a composition prepared by combining nanomaterials with a halogen-containing polymer or monomer to form a nanocomposite. In one application of the invention, carbon nanotubes may be dispersed in a halogen-containing polymer by melt or solution processing to form a nanocomposite. Furthermore, at low nanotube loading levels, the resulting composition may be formed into a transparent film, fiber, powder, liquid resin, or solution.

A "halogen-containing polymer" or "halogen-containing monomer" as described herein and as employed in the invention may include essentially any or all Group VII elements within a polymeric structure. The halogen species may be fluorine, chlorine, bromine or iodine, for example, depending upon the particular application.

In one specific aspect of the invention, the halogen-containing polymer comprises a fluoropolymer such as those derived from monomers containing trifluorovinyl ether (TFVE) groups (as initially described in: "Fluoropolymer Nanotube Composites for Coatings and Nanoscopic Probes" Shah, H.; Czerw, R.; Carroll, D.; Goldner, L.; Hwang, J.; Ballato, J.; Smith, Jr., D. W. *Polym. Mat. Sci. & Eng. (Am. Chem. Soc., Div. PMSE)* 2000, 82, 300).

Whereas these polymers are receiving consideration for structural composites, there are commercial applications of equal importance for optical composites. From a potential host materials perspective, perfluorocyclobutane (PFCB) polymers have suggested for use in optical fibers and dielectric waveguides. See, for example, "Property Tailored Perfluorocyclobutyl (PFCB) Copolymers for Optical Devices" Smith, Jr., D. W.; Kumar, S.; Chen, S.; Ballato, J.; Nelson, E.; Jin, J.; Foulger, S. in *Design, Manufacturing, and Testing of Planar Optical Waveguide Devices*, R. A. Norwood, Ed. SPIE Proc. 2001, 4439, 51-62.

In specific applications, the fluoropolymer may comprise a perfluorocyclobutane (PFCB) aromatic ether moiety, as further discussed herein. In still other applications, other halogen-containing polymers or monomers or copolymers may be employed, including copolymers of PFCB, polyvinylidenedifluoride (PVDF), and copolymers of PVDF.

Other fluoropolymers and chloropolymers that may be employed include those polymers and copolymers made from monomers such as: perfluoroallyl vinyl ethers, chlorotrifluoroethylene, fluorovinyl ethers, hexafluoroisobutylene, hexafluoropropylene, hexafluoropropylene oxide, perfluorormethyl vinyl ether, perfluoroalkyl vinyl ether, fluoroalkylacrylates, fluoroalkylmethacrylates, tetrafluoroethylene, vinylidene dichloride, vinyl fluoride, vinylidene difluoride, trifluoroethylene, and vinyl chloride. Some commercial trade names for fluoropolymers which may be employed include: Teflon, Teflon AF, Cytop, Halar, Tefzel, Hostaflon ET, Aflon COP, Neoflon, Teflon FEP, Hostaflon TFA, Algoflon, Neoflon AP, Kel-F, Aclon, Voltaflef, Diaflon, Teflon PFA, Fomblin, Krytox, Denum, Teflon PTFE, Fluon, Hostflon PTFE, polyflon, Kynar, Hylar, Solef, KF, Tedlar, Viton A, Flurel, Technoflon, Dai-el, THV, Fluorobase T, Viton B, Kelrez, Aflas, Kel-F 3700, Technoflon XL, Technoflon G, Viton G, Viton GLT.

Other halogenated polymers that may be employed include: halosilicones, halopolyurethanes, halopolyphosphazenes, halopolycarbonates, haloepoxy resins, halopolyamides, halopolyimides, halocyanurate resins, halopolystyrenics, halogenated polyolefins, halopolycyclohexane, halogenated ethylene-propylene-dienemonomer (EPDM) resins, halogenated acrylics, and halogenated polyacrylonitriles.

EXAMPLES

The host materials used in this study are a set of four fluoropolymers with different atomic percentages of fluorine. The polymers, described in some detail below, are a perfluorocyclobutyl (PFCB) aromatic polyether thermoplastic, one copolymer of PFCB, and poly(vinylidenedifluoride) (PVDF) and one copolymer of PVDF. These are compared to a limited extent with poly methylmethacrylate (PMMA).

Host Materials PFCB/PFCB-Copolymer

Perfluorocyclobutyl (PFCB) polymers used were prepared from commercially available precursors as described elsewhere. Specifically, thermoplastic PFCB polymers used in this study were prepared from 4,4'-bis(trifluorovinyloxy)biphenyl or 4,4'-bis(trifluorovinyloxyphenyl)hexafluoro-isopropylidene, or for copolymers, a trifunctional comonomer tris(trifluorovinyloxyphenyl) ethane.

Perfluorocyclobutyl (PFCB) polymers are prepared from the free radical mediated thermal cyclopolymerization of trifunctional and bifunctional aryl trifluorovinyl ether monomers from which a variety of thermally stable ($T_g$~350° C.), low dielectric constant thermoplastic and thermosetting materials can be obtained. As a unique class of partially fluorinated polymers, PFCB polyaryl ethers combine the processability and durability of engineering thermoplastics with the optical, electrical, thermal, and chemical resistant properties of traditional fluoroplastics. This makes them particularly interesting for nanocomposite work.

Figure 1B:
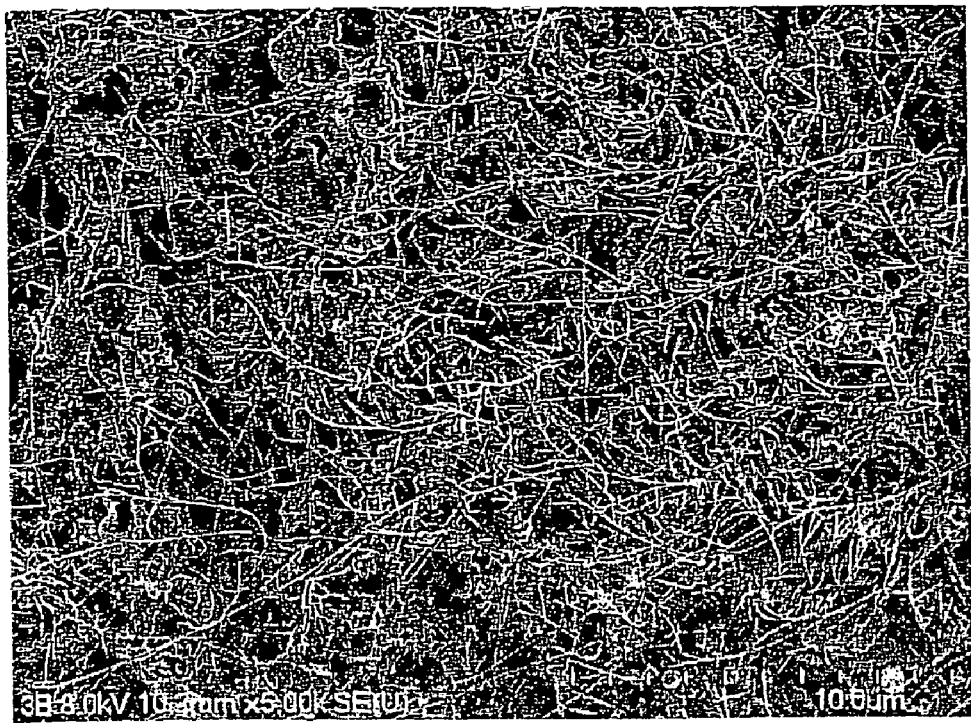
Figure 1C:
Figure 1D:
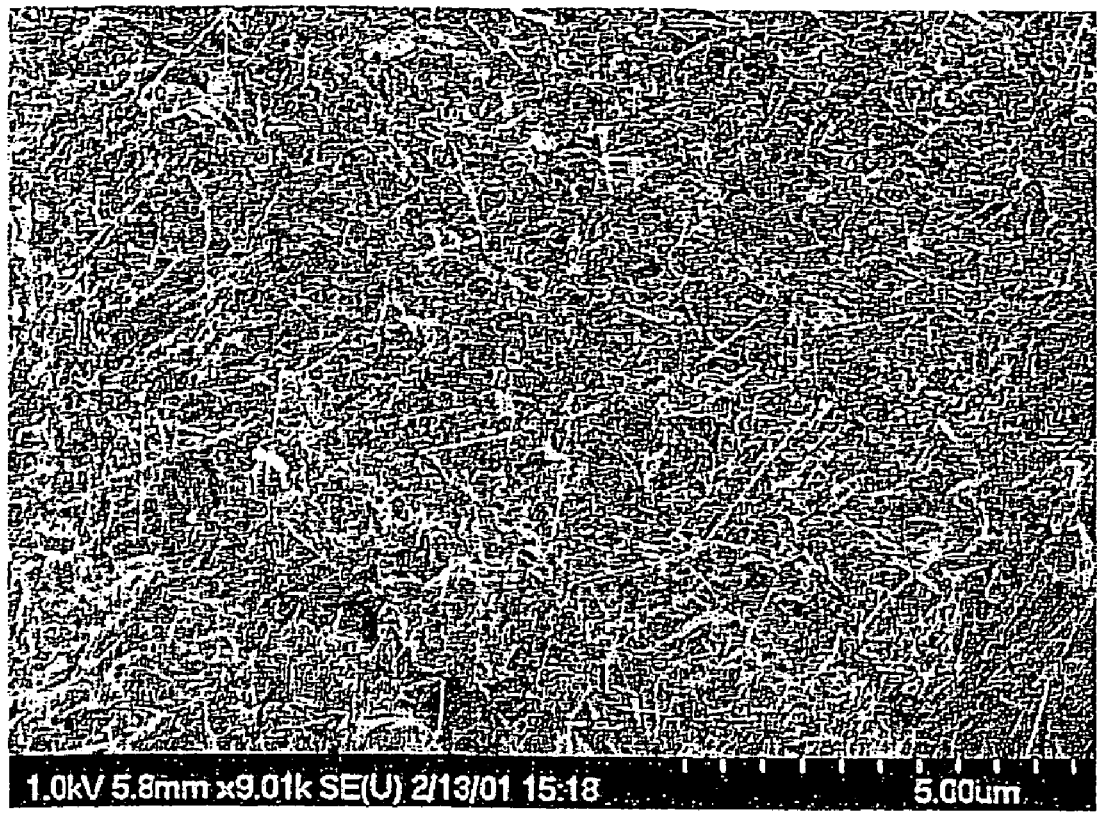
FIGS. 1*d-f* show photographs of PVDF, as further discussed herein.
Figure 1E:

To create the initial nanocomposite matrix, trifunctional monomer, 1,1,1-tris-(4-trifluorovinyloxyphenyl)ethane was used. Since this monomer monomer has a melting point just above room temperature (40 C), MWNTs were easily mixed with the liquid monomer by ultra-sonication for 1 hour. After sonication, the monomer/MWNT solution was a grayish, translucent liquid with very little visible aggregation. The solution was then polymerized by thermal cyclo-polymerization. The resulting nanocomposite as can be seen in FIG. 1b.

Host Materials PVDF/PVDF-Copolymer

The second major class of fluoropolymers used in this study, Polyvinylidene difluoride (PVDF), possesses a unique blend of properties that makes it amenable to many processing techniques and many end uses; particularly its piezoelectricity is widely utilized commercially.

PVDF is a crystalline polymer (mp.=171° C.). Since the poly(vinylidenedifluoride) for the work is commercially available, polymerization routes and synthesis chemistry will not be discussed here in detail. The copolymer of PVDF, Poly(vinylidenedifluoride-co-hexafluoropropylene) (HFP), is the other copolymer examined in this study and is generally prepared by emulsion polymerization under pressure using a persulfate-bisulphite initiation system for free radical polymerization. The PVDF itself is highly crystalline. When copolymerized with hexafluorpropylene (HFP), the degree of crystallinity is greatly reduced and its solubility in solvents is increased.

The PVDF and HFP were dissolved in N,N-dimethylacetamide (purchased from Aldrich Chemical) to give a 10% solution by weight. Occasional stirring was done to promote dissolution. To these polymer solutions weighed proportions of purified MWNTs were added and sonicated in a water bath for close to 3 hrs. The sonicated solutions look gray-black in color and are further sonicated in a probe type sonicator (Branson Sonifier) for approximately 30 mins. The high power ultrasonication enhances the extent of mixing, which results in the presence of very little visible aggregation.

The sonicated samples were drop cast on silicon wafers heated to 120° C. Resulting films are approximately 70-80 microns thick, with no visible aggregates. For thicker samples (~100-120 microns), films were cast in a Teflon mold. The MWNT loading used varied for different property analysis ranging from 0.1-35 wt%.

The molecular weights of the polymers used for these studies were approximately 50,000 for the PFCB thermoplastic and pre-network resins; and around 500,000 for the PVDFs. As noted, the PVDF tends to be rather crystalline in morphology, whereas the PFCB/PFCB-co and PVDF-co exhibit a glassy microstructure. Volume resistivity data was collected using a Keithley 8009 Resistivity Test Fixture and Keithley Electrometer (ASTM D257).

In some applications, a composition is made having carbon-based nanotubes or nanomaterials showing a thermal conductivity greater than 1.25 W/mK at a nanomaterial loading level of about 0.01 to about 10 weight %. In other applications, the composition may show a volume resistivity of less than about $10^{10}$ ohm cm at a nanomaterial loading level from about 0.01 to about 10 weight %. Furthermore, in other applications a composition may exhibit an optical transmission of greater than 80% at a nanomaterial loading level of about 0.01 to about 80 weight %. In yet other applications, the composition may show an optical transmission of greater than 50% at a nanomaterial loading level from about 0.01 to about 5 weight %.

Microscopy

To first examine the microstructure of the matrix nanocomposites, we imaged fracture surfaces of the materials with a field-emission SEM (Hitachi 4700S). Shown in FIG. 1 is a series images fluoropolymer nanocomposites loaded with 1% wt. of MWNTs (multiwalled carbon nanotubes). The nanophase of the composites in this study are all arc grown MWNTs with diameters ranging from 5 nm to 30 nm and generally around 1 micron in length. FIGS. 1*a, b, c*, show a PFCB composite. From FIG. 1*a*, it is.clear that settling occurs during processing. In fact, for the PFCB hosts, the nanomaterials are always observed settled to the bottom surface of the films. For thinner films as used in the optical studies of this work, this effect is minimized. FIG. 1*b* does show, however, that the volume of the settled material is infused with polymer and nanotubes. When the edges of the settled regions are examined (FIG. 1*c*) it is clear that the nanotubes are in small bundles and that agglomeration has been well mitigated.

Agglomerate mitigation is also observed for the PVDF composites. Notice that while most of the nanocomposite for the 1% wt. loaded PVDF host appears extremely uniform (FIG. 1*d*), occasional agglomeration of the nanophase is observed as in FIG. 1*e*. Naturally, it is important to realize that for the PVDF hosts used, a much higher molecular weight of the polymer is being processed than in the case of the PFCBs. This leads to higher viscosities and higher processing temperatures with the result that initial blends are not as complete. However, these large agglomerates are not extremely common within the host and generally most of the nanomaterials have been effectively incorporated into the matrix.

Figure 1F:
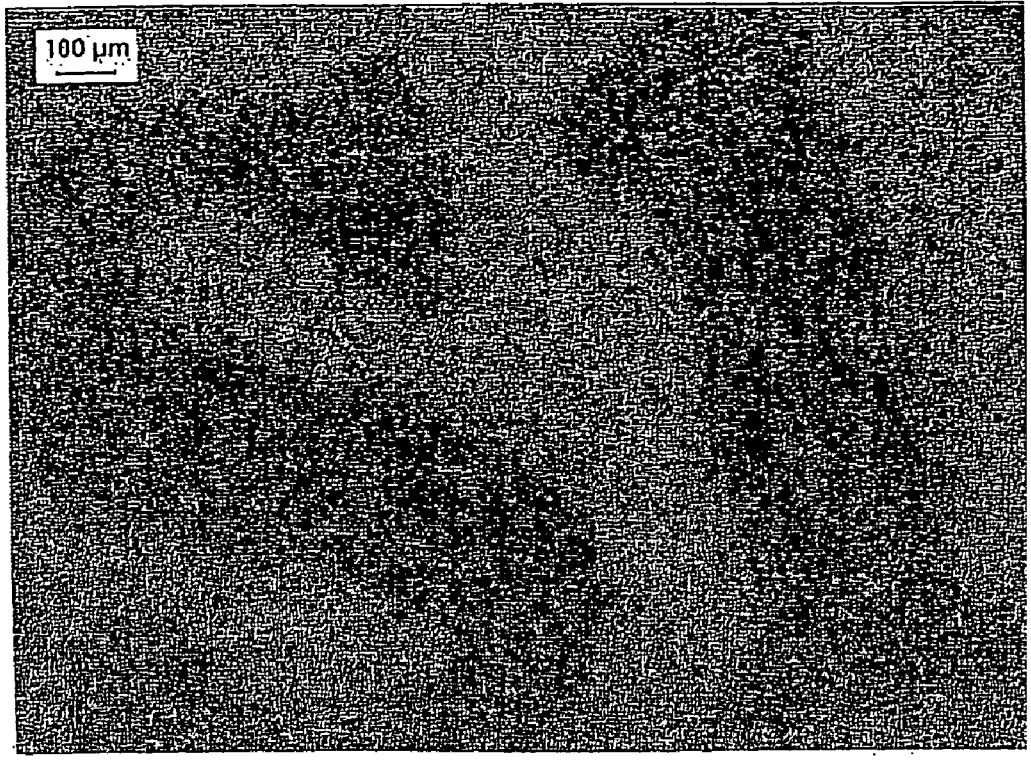

As a demonstration of the overall clarity of the nanocomposites, FIG. 1*f* shows an optical micrograph of a PFCB matrix nanocomposite loaded to 0.5% wt. This photograph is looking through the 1 mm thick composite at 12 point type letters from a laser printer. The dots around the lettering are due to overspray of the printer. No aggregation of agglomeration can be seen for these large samples and the optical transmission of this particular example is approaching 80%.

Figure 2A:
FIGS. 2*a-c* include photos of samples of composites of PVDF/HFP, as further discussed herein.
Figure 2B:
Figure 2C:

In FIGS. 2*a-f*, the separation of nanotube bundles into isolated tubes is examined using both SEM and TEM (scanning electron microscopy and transition electron microscopy). In FIG. 2*a*, the bundles exiting the PFCB hosts indicate that tube separation is incomplete but sufficient still that the samples are optically clear (at low tube loadings). From TEM, FIG. 2*b, c*, a number of isolated individual nanotubes can be seen throughout the matrix. These nanocomposites are formed without significant shear forces being added during matrix processing. Thus, nanotube separation from bundles is primarily due to wetting interactions with the host.

Optical Scattering

Figure 3:
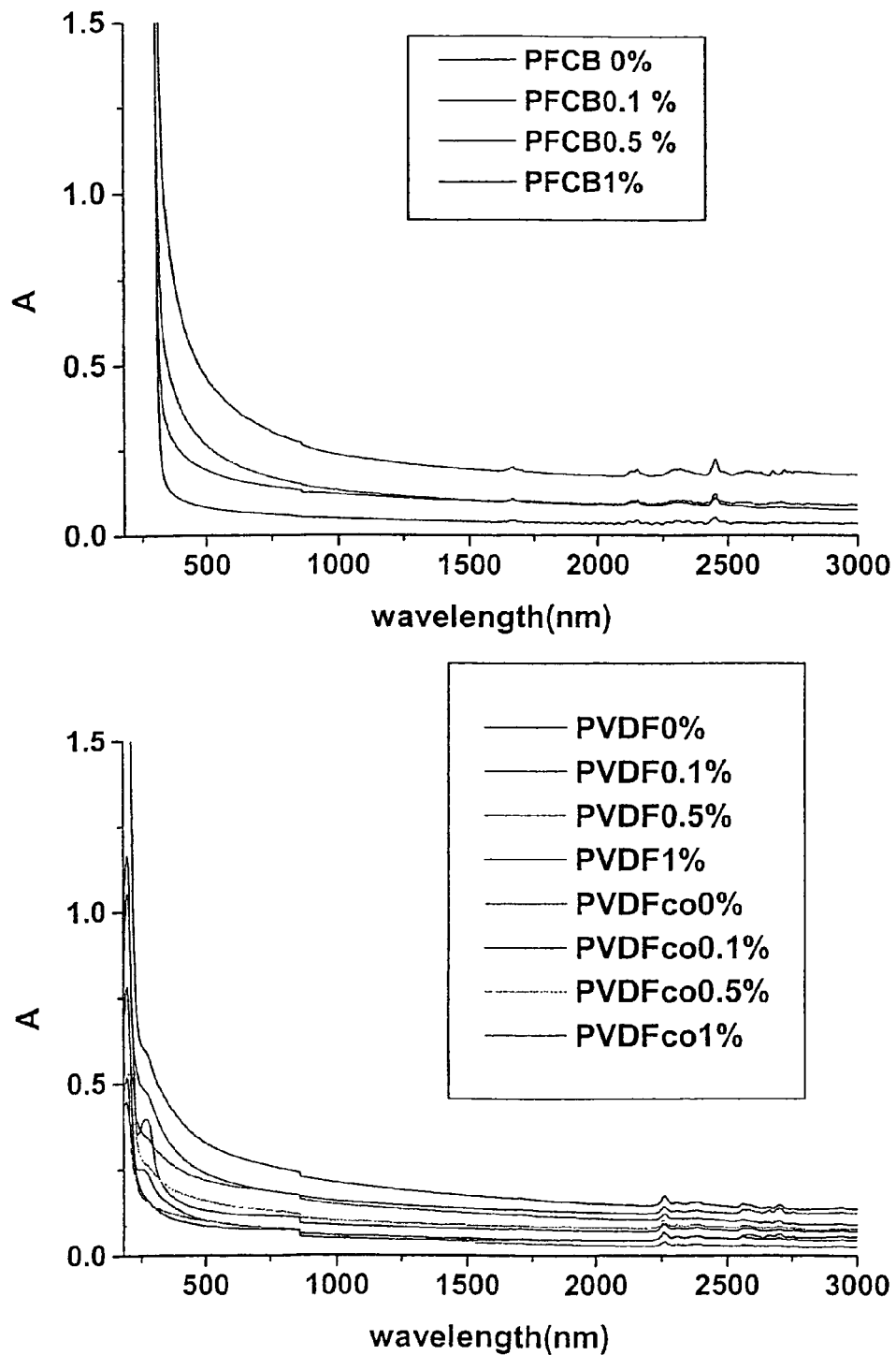
FIG. 3 compares the absorption curves from the PFCB materials with those of PVDF and PVDF-copolymer nanocomposites.
Figure 4:
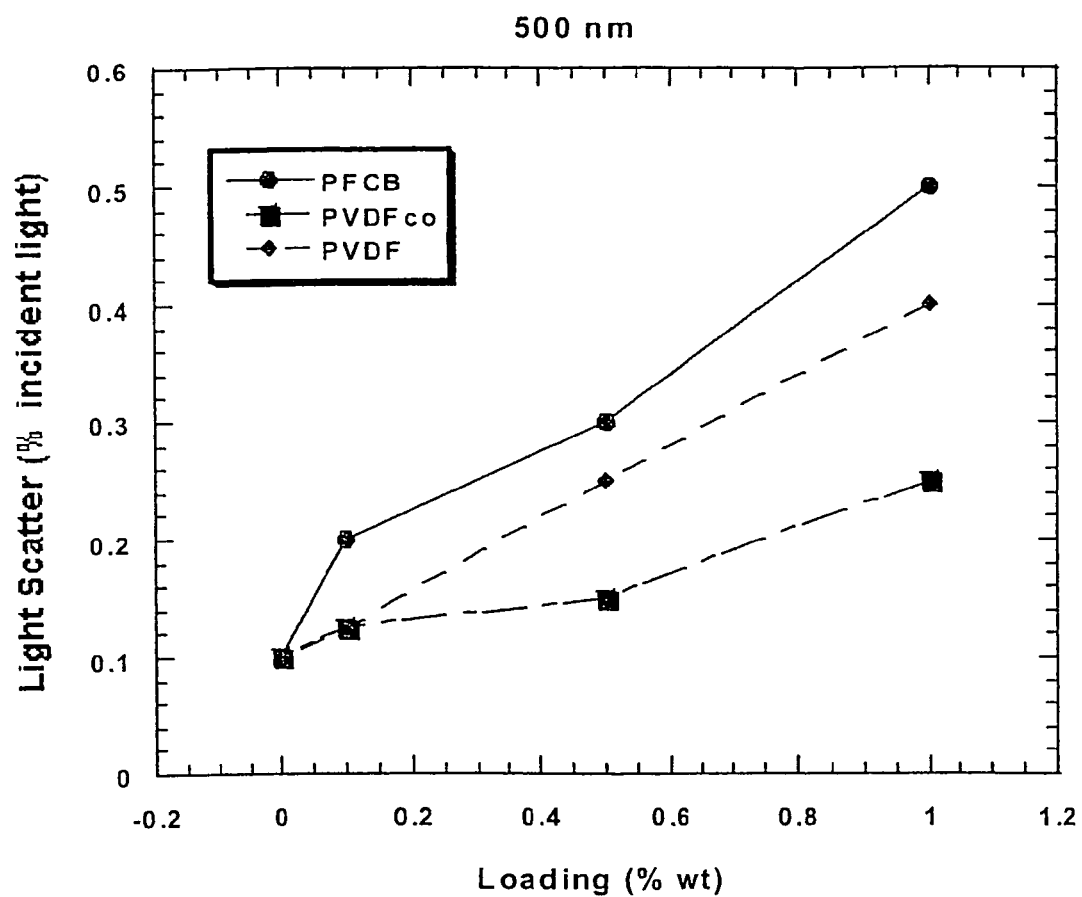
FIG. 4 shows scattered light at 500 nm from PFCB, PVDF, and PVDF-copolymer.

While electron and optical microscopy is one way of determining local dispersion characteristics, it is instructive to look at average dispersion properties over large areas. Optical scattering is a quick and easy way to understand the average particle size within the matrix. Though we will not present quantitative light scattering numbers here a comparison of the scattering for samples of the same thickness shows an interesting trend. FIG. 3 compares the absorption curves from the PFCB materials with those of the PVDF and PVDF-co nanocomposites. These films were 1 mm thick and the curves were taken using a Perkin Elmer Lambda-900 UV-Vis-NIR spectrometer. Notice in each case the strong Rayleigh component of the scattering. As is well known in optics of scattering media, this short wavelength tail is directly related to the size of the scattering particles assuming small host influences and a smoothly varying function of reflectivity and absorption. For the case of carbon nanotubes (multiwalled) these Rayleigh tails should be directly proportional to the aggregate size within the matrix. Clearly, the Rayleigh scattering has been strongly suppressed in all of the fluoropolymer composites. However, the PVDFs exhibit a stronger suppression of this scattering than does the PFCB. In fact, the PVDF-copolymer has the smallest Rayleigh scattering of any of the composites. If the light scattering at a given wavelength is compared between the different hosts, we can see that the increase in Rayleigh scattering (as a function of loading from 0.1% to 1.0%) is the strongest with the PFCBs and weaker for the PVDF-copolymer. In the example of FIG. 4, we examine the total scattered light at 500 nm from PFCB, PVDF, PVDF-copolymer. The loading in each of these hosts increases, the total scattered light from PFCB and PVDF composites is more than double that of PVDF-copolymer composites for the same incident flux at loadings above 0.5% wt. Since the Rayleigh component of the scatter is, by far, the largest component of this scattered light, we interpret this as meaning that the size of the aggregates within the matrices is smaller for the PVDF-copolymer composites and is larger. for the PVDF and PFCB composites. Further, as expected, this aggregation grows with the loading.

Results

Figure 5:
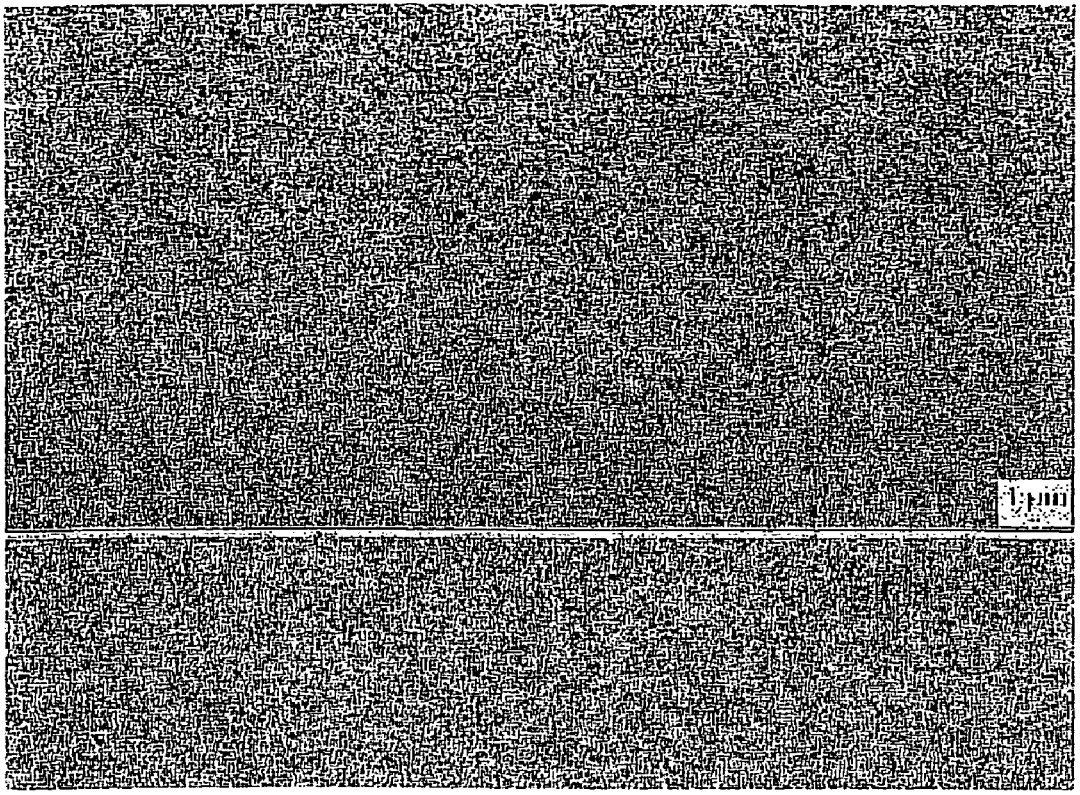
FIG. 5 is a 1 mm thick film of polymethylmethacrylate (PMMA)

To understand these results in context, a comparison with optically transparent, nonfluorinated polymers is useful. Shown in FIG. 5 is a 1 mm thick film of polymethylmethacrylate (PMMA). Large aggregates can be seen. These composites were created in an analogous fashion to the fluoropolymer examples discussed herein. The PMMA was solved in acetone and mixed with a suspension of MWNT, also in acetone.

Generally, microscopy and optical scattering suggests that the fluorine content of the polymers is responsible for the dispersion characteristics. In FIG. 6, surface energies and fluorine content is compared for the five polymers used in this study. The estimate of dispersion quality is, of course, subjective and based on both microscopy as well as optical scatter. The surface energies in this study were determined using a contact angle meter and Fowke's two-component model. These numbers correlate well with the suppliers for PVDF and PMMA. Notice that the surface energy is roughly the same in the case of PFCB and PMMA yet the dispersion is significantly better in the case of the fluoropolymers. Though the PFCB has a higher surface energy than that of the PVDF (PVDF-copolymer was not determined), the dispersion quality seems to scale directly with fluorine content.

Figure 7:
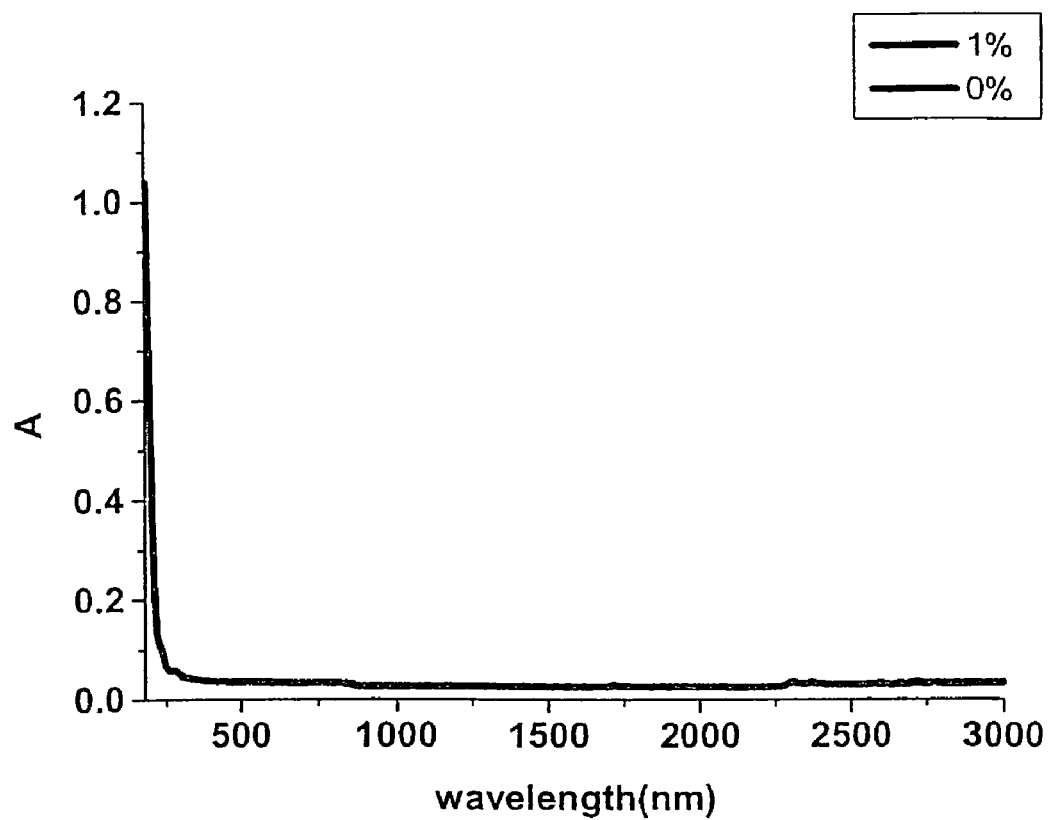
FIG. 7 is a graph of wavelength versus absorption, as further discussed herein.

Recently there have been several works discussing fluorine doping of carbon nanotubes. This suggests strong interactions between nanotubes and fluorine and suggests this as the mitigating factor in the inter-tube van der Waals interactions. This, too, suggests that equally as reactive chloro-polymers might make equally as good host materials. As an initial investigation, Poly vinyl chloride was used as a host and blended with MWNTs in an analogous fashion to the composites above. FIG. 7 shows the optical scattering from PVC-nanotube composites for 1% wt. loading and 0% loading. Surprisingly, these host materials show very little Rayleigh scattering. This, again, supports the general idea that the halocarbon nature of the host polymer can be used to disperse the nanotubes using low-shear blending methods.

It has been demonstrated in these examples that a new class of fluorocarbon matrix composites may be employed based on carbon 15 nanotubes dispersed in fluoropolymer hosts. Clearly, other halo-polymers also could be used, with varying results depending upon the particular polymer selected, and the manufacturing and processing conditions. Different applications may use other types of halo-polymers, still within the scope of this invention.

Optical scatter and microscopy data suggests that dispersion can be directly controlled by adjusting the fluorine content of the polymer. Further, the role of the fluorine is mitigation of tube-tube interactions to allow for low-shear blending. These composites provide opportunities in the creation of new optically transparent, for example, and potentially electrically conductive films and the potential for new nonlinear optical materials.

In another application of the invention, the nanocomposite is employed as the sensing probe in atomic force and near field optical microscopes. The probe may employ a frontal face having a nanotube protruding therefrom as the sensing element. As an example, a carbon nanotube composite of the invention has the potential to dramatically improve spatial resolution of these scanning probe microscopes.

FIG. 8a shows a drawn PFCB fiber containing carbon nanotubes. FIG. 8b provides a micrograph of a near field optical probe using a frontal surface. In FIG. 8b, a near field optical probe 9 shows dispersed nanotubes 10. For example, the nanotube 10 shown may in some applications be approximately 0.4 μm from tip to tip. Furthermore, a fiber frontal surface 11 is shown which corresponds to the ending point for one tip of the nanotube 10. The field of view 12 (of the probe 9) is shown beyond the fiber frontal surface 11. The field of view 12 is the area under examination by probe 9.

As provided below, the compositions of the invention exhibit adequate thermal and electrical conductivity for these applications while maintaining mechanical flexibility, toughness, and, potentially, optical clarity. This is realized through the unique level of dispersion for very low loadings (<0.1 to 5 weight %) of high conductivity nanotubes in a halopolymer host.

PFCB chemistry is generally well suited for carbon nanotube composite fabrication. Carbon nanotubes can be easily and uniformly dispersed in trifluorovinyl ether (TFVE) monomers by gentle sonication at ca. 70° C. Multi-walled and single walled nanotubes could be employed. Bulk polymerization of the mixtures results in optically clear nanocomposites at low loading levels. It is possible to fabricate nanocomposites containing isolated carbon nanotubes in fluoropolymers for both specialty coatings and nanoprobe applications. Very low levels of well-dispersed nanotubes may be used in coatings which require multifunctional properties.

In the practice of the invention, it is possible to provide a halogen-containing polymer with carbon nanotubes, and to form a combined polymer matrix of dispersed carbon nanotubes within the polymer matrix. There is no limit to the number of halogen-containing polymers that can be used in the practice of the invention. For example, polymers containing bromine, chlorine, iodine and fluorine are examples of halogens which can be incorporated into polymeric structures in the practice of the invention.

Example

Halo-Polymer Compositions With Clay Materials

Nanocomposite matrix compositions may be developed using halogen-containing monomers or polymers or co-polymers as described above in connection with the Examples (or other halogen-containing monomers or polymers as disclosed in this specification) as combined with various clay materials. For example, it is possible to provide in the matrix set forth in the examples above to include a clay product, such as a hydrated aluminum silicate (as one example).

Naturally occurring clays may be used, including but not limited to kaolinite, bentonite, mica, talc, silica nanoparticles, montmorillonite, attapulgite, illite, bentonite, halloysite, fullers earth, kaolin, and polyorganosilicate graft polymers.

There are numerous applications of the compositions of this invention, and the scope of this invention is not limited to any particular composition. It is understood by one of ordinary skill in the art that the present discussion is a description of exemplary embodiments only, and is not intended as limiting the broader aspects of the present invention, which broader aspects are embodied in the exemplary constructions. The invention is shown by example in the appended claims.

What is claimed is:

1. A composition comprising:
   multi-layered nanomaterials, wherein the nanomaterials are selected from the group consisting of hydrated aluminum silicates, talc, mica, and mixtures thereof; and
   a halogen-containing polymeric matrix comprising a fluoropolymer, wherein the fluoropolymer is selected from the group consisting of a trifluorovinylether, a perfluorocyclobutane, a polyvinylidene difluoride copolymer, and chlorotrifluoroethylene;
   wherein the nanomaterials are dispersed throughout the halogen-containing polymeric matrix and are present in the composition as multi-layered nanomaterials in an amount of less than 0.5% by weight of the composition.

2. The composition of claim 1 in which the composition exhibits a thermal conductivity greater than 1.25 W/mK.

3. The composition of claim 1 in which the composition exhibits an optical transmission of greater than 80%.

4. The composition of claim 1 in which the composition exhibits an optical transmission of greater than 50%.

5. The composition of claim 1, in which the nanomaterials comprise bentonite.

6. The composition of claim 1, in which the nanomaterials comprise kaolin.

7. A composition comprising:
   carbon nanotubes; and
   a halogen-containing polymeric matrix, wherein the halogen is fluorine, iodine, or bromine;
   wherein the carbon nanotubes are dispersed throughout the halogen-containing polymeric matrix and are present in the composition in an amount of less than 0.5% by weight of the composition.

8. The composition of claim 7 in which the polymeric matrix comprises a fluoropolymer.

9. The composition of claim 8 wherein the fluoropolymer comprises a trifluorovinylether.

10. The composition of claim 8 wherein the fluoropolymer comprises a perflourocyclobutane.

11. The composition of claim 7, wherein the polymeric matrix comprises polyvinylidene diflouride.

12. The composition of claim 11, wherein the polymeric matrix comprises polyvinylidene difluoride copolymer.

13. The composition of claim 7 in which the halogen-containing polymeric matrix further comprises a chloropolymer.

14. The composition of claim 13 wherein the chloropolymer is polyvinyl chloride.

15. The composition of claim 13 in which the chloropolymer is poly(vinylidene-dichloride).

16. The composition of claim 7 in which the polymeric matrix comprises chiorotrifluoroethylene.

17. The composition of claim 7 in which the carbon nanotubes are present in the composition in an amount of less than 0.1% by weight of the composition.

18. The composition of claim 7 in which the carbon nanotubes are present in the composition in an amount of between about 0.01% and 0.5% by weight of the composition.

19. The composition of claim 7 in which the composition exhibits an optical transmission of greater than 80%.

20. A method for forming a composition comprising:
  (a) providing nanomaterials, wherein the nanomaterials selected from the group consisting of multi-layered hydrated aluminum silicates, multi-layered talc, multi-layered mica, carbon-based nanomaterials, and mixtures thereof;
  (b) providing a halogen-containing polymer comprising a perfluorocyclobutane aromatic ether polymer;
  (c) combining the nanomaterials with the halogen-containing polymer to form a mixture, wherein the nanomaterials are combined with the polymer in an amount of less than 0.5% by weight of the mixture; and
  (d) dispersing the nanomaterials throughout the halogen-containing polymer, wherein the nanomaterials are not degraded during the dispersion process.

21. The method of claim 20, in which the nanomaterials are combined with and dispersed throughout the halogen-containing polymer via a solution mixing process.

22. The method of claim 20, in which the nanomaterials are combined with and dispersed throughout the halogen-containing polymer via a melt mixing process.

23. The method of claim 20, the method further comprising heating the mixture of the nanomaterials and the halogen-containing polymer.

24. The method of claim 20, the method further comprising sonicating the mixture of the nanomaterials and the halogen-containing polymer.

25. The method of claim 20, in which the nanomaterials comprise carbon nanotubes.

26. A method for forming a composition comprising:
  (a) providing nanomaterials, wherein the nanomaterials are selected from the group consisting of multi-layered hydrated aluminum silicates, multi-layered talc, multi-layered mica, carbon-based nanomaterials, and mixtures thereof;
  (b) providing a halogen-containing monomer, wherein the halogen is fluorine, iodine, or bromine;
  (c) combining the nanomaterials with the halogen-containing monomer to form a mixture, wherein the nanomaterials are combined with the polymer in an amount of less than 0.5% by weight of the mixture, wherein the nanomaterials are not degraded during the combination procedure; and
  (d) polymerizing the monomer following step (c) to form a polymeric matrix in which the nanomaterials are dispersed.

27. The method of claim 26, in which the halogen-containing monomer comprises fluorine.

28. The method of claim 27, in which the polymeric matrix comprises perfluorocyclobutane aromatic ether polymer.

29. The method of claim 27, in which the polymeric matrix comprises polyvinylidene diflouride.

30. The method of claim 29, in which the nanomaterials comprise carbon nanotubes.

31. A probe for microscopy, comprising:
  A fiber with a frontal surface comprised of a polymeric matrix having dispersed carbon nanotubes within the polymeric matrix.

32. A composition prepared by combining
  (a) carbon-based nanotubes,
  (b) a halogen-containing monomer, and
  (c) a naturally occurring material selected from the group of materials consisting of: Group III elements and Group IV dopants.

33. The composition of claim 32, in which the naturally occurring material is combined with a halogen-containing monomer.

34. The composition of claim 32, in which the naturally occurring material is combined with a halogen-containing polymer.

35. The composition of claim 32, in which the naturally occurring material is combined with nanomaterials.

36. A method for forming a composition comprising:
  (a) providing nanomaterials, the nanomaterials comprising carbon nanotubes;
  (b) providing a halogen-containing polymer, wherein the halogen is fluorine, iodine, or bromine;
  (c) combining the nanomaterials with the halogen-containing polymer to form a mixture, wherein the nanomaterials are combined with the polymer in an amount of less than 0.5% by weight of the mixture; and
  (d) dispersing the nanomaterials throughout the halogen-containing polymer, wherein the nanomaterials are not degraded during the dispersion process.

37. The method of claim 36, in which the halogen-containing polymer comprises a fluoropolymer.

38. The method of claim 37, in which the fluoropolymer comprises a perfluorocyclobutane aromatic ether polymer.

39. The method of claim 37, in which the polymer comprises polyvinylidene diflouride.

40. The method of claim 36, in which the nanomaterials are combined with and dispersed throughout the halogen-containing polymer via a solution mixing process.

41. The method of claim 36, in which the nanomaterials are combined with and dispersed throughout the halogen-containing polymer via a melt mixing process.

42. The method of claim 36, the method further comprising heating the mixture of the nanomaterials and the halogen-containing polymer.

43. The method of claim 36, the method further comprising sonicating the mixture of the nanomaterials and the halogen-containing polymer.

* * * * *